(12) United States Patent
Bonnet et al.

(10) Patent No.: US 6,321,248 B1
(45) Date of Patent: Nov. 20, 2001

(54) PROCESS FOR DETERMINING AN OVERFLOW TO THE FORMAT OF THE RESULT OF AN ARITHMETIC OPERATION CARRIED OUT ON TWO OPERANDS

(75) Inventors: Claire Bonnet, Grenoble; Sébastien Ferroussat, Fontaine; Didier Fuin, Lumbin, all of (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/206,000

(22) Filed: Dec. 4, 1998

(30) Foreign Application Priority Data

Dec. 23, 1997 (FR) .................................................. 97 16360

(51) Int. Cl.[7] ...................................................... G06F 7/38
(52) U.S. Cl. .............................................................. 708/552
(58) Field of Search ..................................... 708/550–553

(56) References Cited

U.S. PATENT DOCUMENTS

| | | | | |
|---|---|---|---|---|
| 5,198,993 | * | 3/1993 | Makakura | 708/551 |
| 5,204,832 | * | 4/1993 | Nakakura | 708/551 |
| 5,745,397 | | 4/1998 | Nadehara . | |
| 5,889,689 | * | 3/1999 | Alidina et al. | 708/533 |
| 5,907,498 | * | 5/1999 | Rim | 708/533 |
| 6,161,119 | * | 12/2000 | Gabriel et al. | 708/551 |

FOREIGN PATENT DOCUMENTS

| | | | |
|---|---|---|---|
| 41 25 120 A1 | 2/1993 | (DE) | G06F/7/50 |
| 0 780 759 A1 | 6/1997 | (EP) | G06F/7/50 |

OTHER PUBLICATIONS

Patent Abstracts of Japan, vol. 15, No. 218, Jun. 4, 1991, and JP 03 062124 A (NEC IC Microcomput Syst Ltd), Mar. 18, 1991.

K. Suzuki et al., "A 2.4–ns, 16–BIT, 0.5–$\mu$m CMOS Arithmetic Logic Unit For Microprogrammable Video Signal Processor LSIs," Proceedings of the Custom Integrated Circuits Conference, Conf. No. 15, May 9, 1993, pp. 12.04.01–12.04.04.

R. Fine, "DSP Microprocessor Offers High Performance With Minimal Design Effort," Wescon Technical Papers, Conference Record, vol. 30, Nov. 18–20, 1986, pp. 1–9.

* cited by examiner

Primary Examiner—Tan V. Mai
(74) Attorney, Agent, or Firm—Lisa K. Jorgenson; Allen, Dyer, Doppelt, Milbrath & Gilchrist, P.A.

(57) ABSTRACT

A process is for determining an overflow to the format of the result of an arithmetic operation carried out by an arithmetic unit on two operands A and B and an input carry digit Cin. This process is executed in parallel to the processing done by the AU on operands A and B, before the AU has determined the result S of the operation.

18 Claims, 3 Drawing Sheets

PROCESS FOR DETERMINING AN OVERFLOW TO THE FORMAT OF THE RESULT OF AN ARITHMETIC OPERATION CARRIED OUT ON TWO OPERANDS

FIELD OF THE INVENTION

This invention relates to electronic circuits performing arithmetic operations, and, more particularly, to a process for determining if the format (or size) of the binary result S of an arithmetic operation between two operands A and B, and an input carry digit Cin exceeds the format allowed for this result.

BACKGROUND OF THE INVENTION

Techniques are known in the domain of integrated circuits using calculation units for verifying if the format allowed for the result of an arithmetic operation carried out by an AU (Arithmetic Unit) on two operands A and B and an input carry digit Cin does not exceed a given format. This technique has applications in most calculation units, such as, calculation units included in programmable circuits, such as, a digital signal processor (DSP) or a microcontroller. When it does, an "overflow beyond n bits" occurs and in this case a result saturation may be applied. In general, this type of overflow is determined after the result has been determined, that is, when the AU has finished processing of operands A and B and the input carry digit Cin. In other words, considering FIG. 1 which schematically shows the various processing steps between when operands A and B and the input carry digit Cin are input into the AU, and when the result S is written in the accumulator, the determination of an overflow is classically done after the calculation step $E_2$.

Therefore, to determine if an overflow has occurred, it is necessary to wait until the AU has finished the calculation. In this case there is a time loss that is particularly long if the calculation done by the AU is complex.

SUMMARY OF THE INVENTION

An object of the invention is to overcome this disadvantage. Accordingly, the present invention is directed to a process capable of determining whether or not there will be an overflow of the result format at the same time as the calculation is being done by the AU, and, if so, to propose a saturation value for this result.

More precisely, the invention relates to a process for determining an overflow for an arithmetic operation carried out by an arithmetic unit (AU) on two operands A and B and an input carry digit Cin input to the AU. This process is characterized in that it is executed in parallel to the process done by the AU on the operands A and B and the input carry digit Cin, and before the AU has determined the result of the arithmetic operation.

Throughout the following description, reference will be made to an arithmetic operation carried out by an arithmetic unit (AU). However, this operation may also be done by an arithmetic and logic unit (ALU).

According to one embodiment of the invention, in which the operands A and B are binary numbers, at least one of the operands A and B has m bits and the format of the required result S has n bits (where n<m), the process includes the steps of: considering only the m−n+1 highest order bits denoted $A_H$ for operand A, and $B_H$ for operand B and an output carry digit $Cout_{n-2}$ of rank n−2; and checking if $A_H$, $B_H$ and $Cout_{n-2}$ satisfy a saturation condition, and if so, deducing that the size of the result S exceeds n bits.

According to this embodiment, the positive saturation condition in the case of an addition is:

$$A_H + B_H + Cout_{n-2} \geq 1,$$

and the negative saturation condition in the case of an addition is:

$$A_H + B_H + Cout_{n-2} < -1,$$

where $Cout_{n-2}$ is the output carry digit of rank n−2 in the arithmetic operation of A, B and Cin.

According to another embodiment of the invention in which the operands A and B are binary numbers, at least one of the operands A and B has m bits and the format of the searched result S has n bits where n<m, the process includes the steps of:

determining the propagation terms $p_i$ and generation terms $g_i$ each defined by a logical relation between components $a_i$ and $b_i$ of operands A and B;

considering only the m−n+1 highest order bits, denoted $P_H$ for propagation terms $p_i$ and $G_H$ for generation terms $g_i$, and the output carry digit of rank n−2; and checking if $P_H$, $G_H$ and $Cout_{n-2}$ satisfy a saturation condition, and if so deducing that the size of the result S exceeds n bits.

If A is expressed on 40 bits and B on 32 bits with n=32 and m=40, the positive saturation conditions are:

$g_{31}=1$ and ($\forall i \in [39:32]$, $p_i=1$) and $Cout_{30}=1$;

or $p_{39}=1$ and $g_{39}=0$ and ($\exists i \in [38:32]$, $g_i=1$);

or $g_{39}=0$ and ($\forall i \in [39:31]$, $p_i=0$) and $Cout_{30}=1$;

or $p_{39}=0$ and ($\exists i \in [38:31]$, $p_i=1$) and $g_{39}=0$;

and the negative saturation conditions are:

$g_{39}=1$ and ($\exists i \in [38:31]$, $g_i=0$);

or ($\forall i \in [39:31]$, $g_i=1$) and $Cout_{30}=0$;

or $p_{39}=1$ and ($\exists i \in [38:32]$, $p_i=0$) and $\forall i \in [38:32]$, $g_i=0$ or ($\forall i \in [39:32]$, $p_i=1$) and $p_{31}=0$ and $g_{31}=0$ and $Cout_{30}=0$ In the following description of the process according to the invention, it will be considered that A and B are two binary numbers, that at least one of A and B has m bits, and that the result S is a binary number with m bits corrected to format with n bits (where A, B and S are coded in two's complement), where n and m depend on the use of the calculation unit. The process according to the invention checks whether the format of the result S that the AU has to calculate will have n bits or less than n bits.

DETAILED DESCRIPTION OF THE PREFERRED EMBODIMENTS

Figure 1:
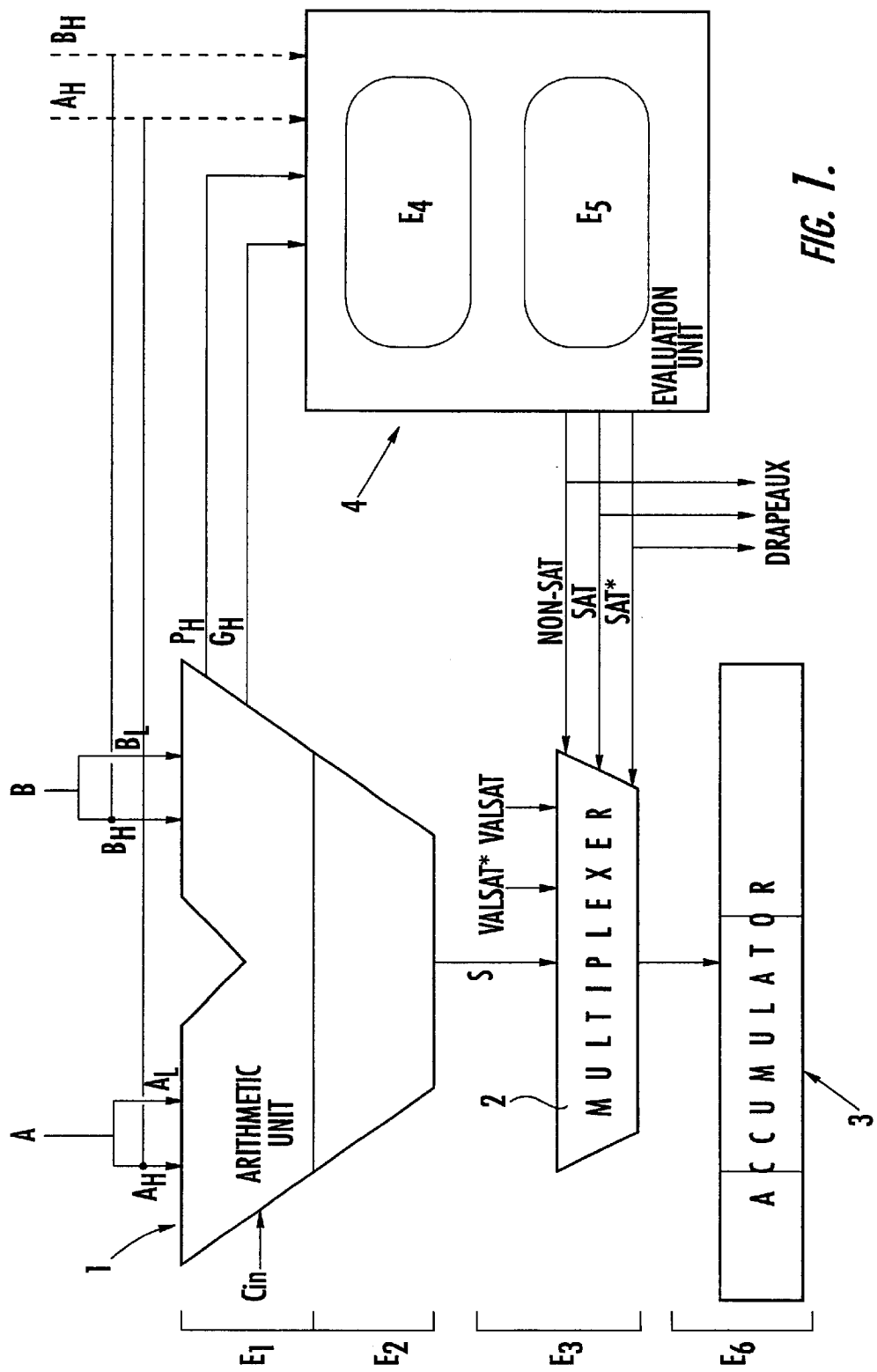
FIG. 1 schematically shows the main steps in the process according to the invention.

FIG. 1 schematically shows the various steps in the process according to the invention. This FIG. 1 shows the AU 1 into which operands A and B and the input carry digit Cin are input, and which carries out processing (step $E_1$, step $E_2$) on operands A and B and Cin to produce an output result S. This result S is sent to a multiplexer 2 during a step $E_3$.

At the same time as the processing done by the AU during steps $E_1$ to $E_3$, the process according to the invention determines whether or not the format of the result S will exceed the format allowed for it. This determination is done during a step $E_4$ by an evaluation unit 4 which receives the data supplied by the AU as input. These data may be of two different types, which will be described later.

If the format of the result S exceeds the specified format, the evaluation unit 4 generates a SAT$^-$ negative saturation flag or a SAT$^+$ positive saturation flag. This information may be used either as flags or to control multiplexer 2 which receives the value of the result S, the negative saturation value $-2^{n-1}$ and the positive saturation value $2^{n-1}-1$, as an input. If this is not the case, the evaluation unit 4 sends a NON-SAT message to multiplexer 2, meaning that saturation did not occur (in other words there was no overflow of the format) and that the result S may be loaded as soon as it has been determined. The result S or the saturation value chosen by the evaluation unit 4 may then be written in an accumulator 3, in a step $E_6$.

In the following description of the process according to the invention, it will be considered that A and B are two binary numbers with m bits, and that the result S is a binary number with m bits corrected to format with n bits (where A, B and S are coded in two's complement), where n and m depend on the use of the calculation unit. The process according to the invention checks whether the format of the result S that the AU has to calculate will have n bits or less than n bits.

In general, determining an overflow (also called "saturation") of the format of result S includes checking if one of the positive or negative saturation conditions expressed as a function of $A_H$, $B_H$ and $Cout_{n-2}$ ($Cout_{n-2}$ is the output carry digit of rank n−2) is satisfied, where:

$A_H$ and $B_H$ are such that $A = A_H \cdot 2^{n-1} + A_L$ and $B = B_H \cdot 2^{n-1} + B_L$ More precisely:

$$A = \sum_{i=0}^{m-1} a_i 2^i = \sum_{i=n-1}^{m-1} a_i 2^i + \sum_{i=0}^{n-2} a_i 2^i = A_H 2^{n-1} + A_L$$

where $$A_H = \sum_{i=n-1}^{m-1} a_i 2^{i-n+1} \text{ and } A_L = \sum_{i=0}^{n-2} a_i 2^i$$

Therefore, the term $A_H$ corresponds to the m−n+1 highest order bits which include a sign bit and the m−n highest order bits. Similarly:

$$B = \sum_{i=0}^{m-1} b_i 2^i = \sum_{i=n-1}^{m-1} b_i 2^i + \sum_{i=0}^{n-2} b_i 2^i = B_H 2^{n-1} + B_L$$

where $$B_H = \sum_{i=n-1}^{m-1} b_i 2^{i-n+1} \text{ and } B_L = \sum_{i=0}^{n-2} b_i 2^i$$

Therefore, the term $B_H$ corresponds to the m−n+1 highest order bits that include a sign bit and the m−n highest order value bits.

For example, for the case of an addition, it is necessary to positively saturate the result S as soon as its format exceeds n bits, namely $S \geq 2^{n-1}$, which is equivalent to writing $A+B+Cin \geq 2^{n-1}$.

Furthermore:

$$S = \sum_{i=0}^{m-1} S_i 2^i = \sum_{i=n-1}^{m-1} S_i 2^i + \sum_{i=0}^{n-2} S_i 2^i = S_H 2^{n-1} + S_L$$

where $$S_H = \sum_{i=n-1}^{m-1} s_i 2^{i-n+1} \text{ and } S_L = \sum_{i=0}^{n-2} s_i 2^i$$

Moreover, $S \geq 2^{n-1}$ means $S_H \geq 1$, hence a positive saturation condition:

$A_H + B_H + Cout_{n-2} \geq 1$, where $Cout_{n-2}$ is the output carry digit of rank n−2.

A negative saturation of the result S results in $S < -2^{n-1}$, which is equivalent to writing $A+B+Cin < -2^{n-1}$. Furthermore, $S < -2^{n-1}$ means $S_H < 1$; therefore the negative saturation condition can be written:

$A_H + B_H + Cout_{n-2} < -1$ where $Cout_{n-2}$ is the output carry digit of rank n−2.

We will now describe two example applications of the process according to the invention. For these examples, the process is applied firstly to a DSP 950 signal processor, and secondly to an ST 10 microcontroller. In these two examples, m is equal to 40 and n is equal to 32. In other words, the arithmetic operation for these two examples is carried out on 40 bits and the saturation format is 32 bits. Furthermore, restrictive assumptions concerning operand B are used in the DSP 950 and the ST 10. In particular for the DSP 950, it is considered that A is expressed on 40 bits and B can be expressed on 32 bits and then extended to 40 bits; therefore the 9 highest order bits are identical; and we then have:

$B_H$=111111111 or $B_H$=000000000, in other words:

$B_H$=−1 or $B_H$=0.

Figure 2:
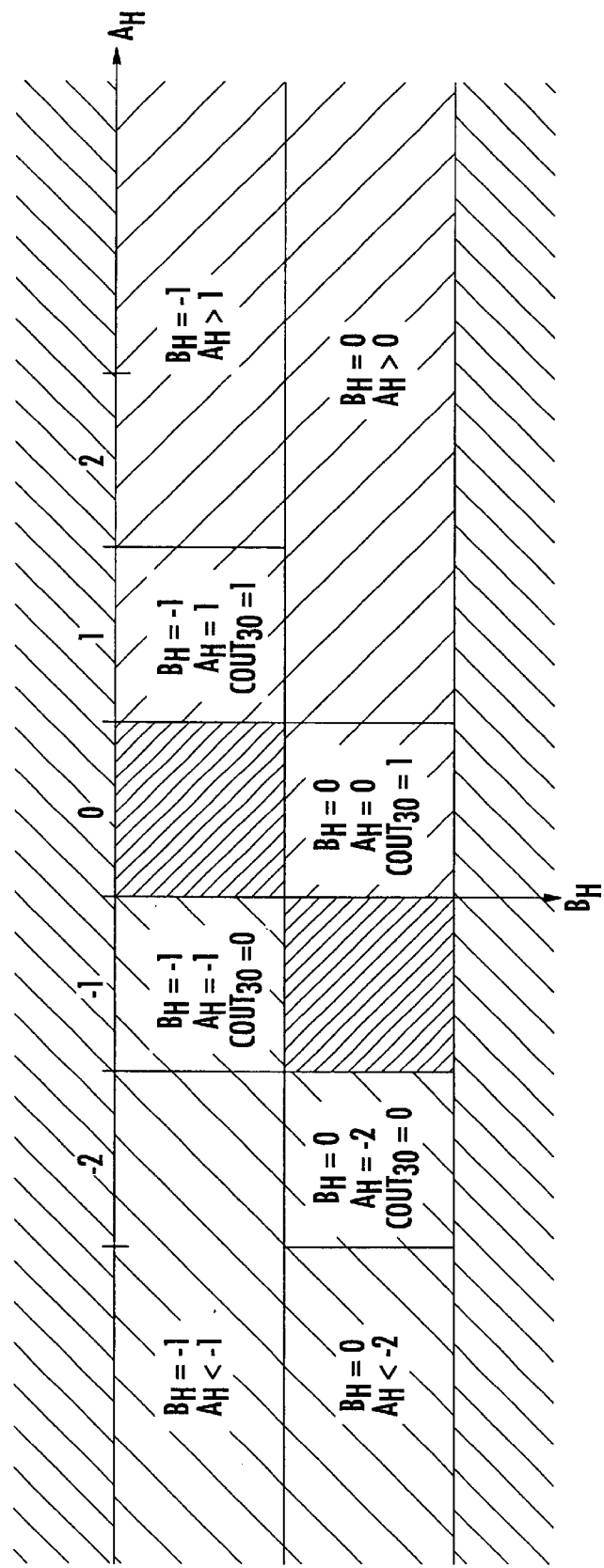
FIG. 2 shows a table representing the various saturation conditions for a DSP 950 if operands A and B are written with terms $A_H$, $A_L$, $B_H$, $B_L$.

In this case, four positive saturation conditions of S can be determined which are summarized in the right part of the table in FIG. 2.

More precisely, these four conditions are:

$B_H$=0 and $A_H$>0;

or $B_H$=−1 and $A_H$>1;

or $B_H$=0 and $A_H$=0 and $Cout_{30}$=1;

or $B_H$=−1 and $A_H$=1 and $Cout_{30}$=1.

Considering the previous assumption about $B_H$, in other words $B_H$=−1 or $B_H$=0, four negative saturation conditions of S are also determined. These four conditions are summarized in the left part of the table in FIG. 2.

More precisely, these conditions are:

$B_H$=0 and $A_H$<−2;

or $B_H$=−1 and $A_H$<−1;

or $B_H$=0 and $A_H$=−2 and $Cout_{30}$=0;

or $B_H$=−1 and $A_H$=−1 and $Cout_{30}$=0.

In the case of the ST 10 microcontroller, the assumption is made that A is expressed on 40 bits and B is expressed on 33 bits and then extended to 40 bits; therefore the 8 highest order bits are identical; we then have:

$B_H$=111111110 or $B_H$=111111111, or $B_H$=000000000 or $B_H$=000000001, in other words:

$B_H$=−2 or $B_H$=−1 or $B_H$=0 or $B_H$=1.

Figure 3:
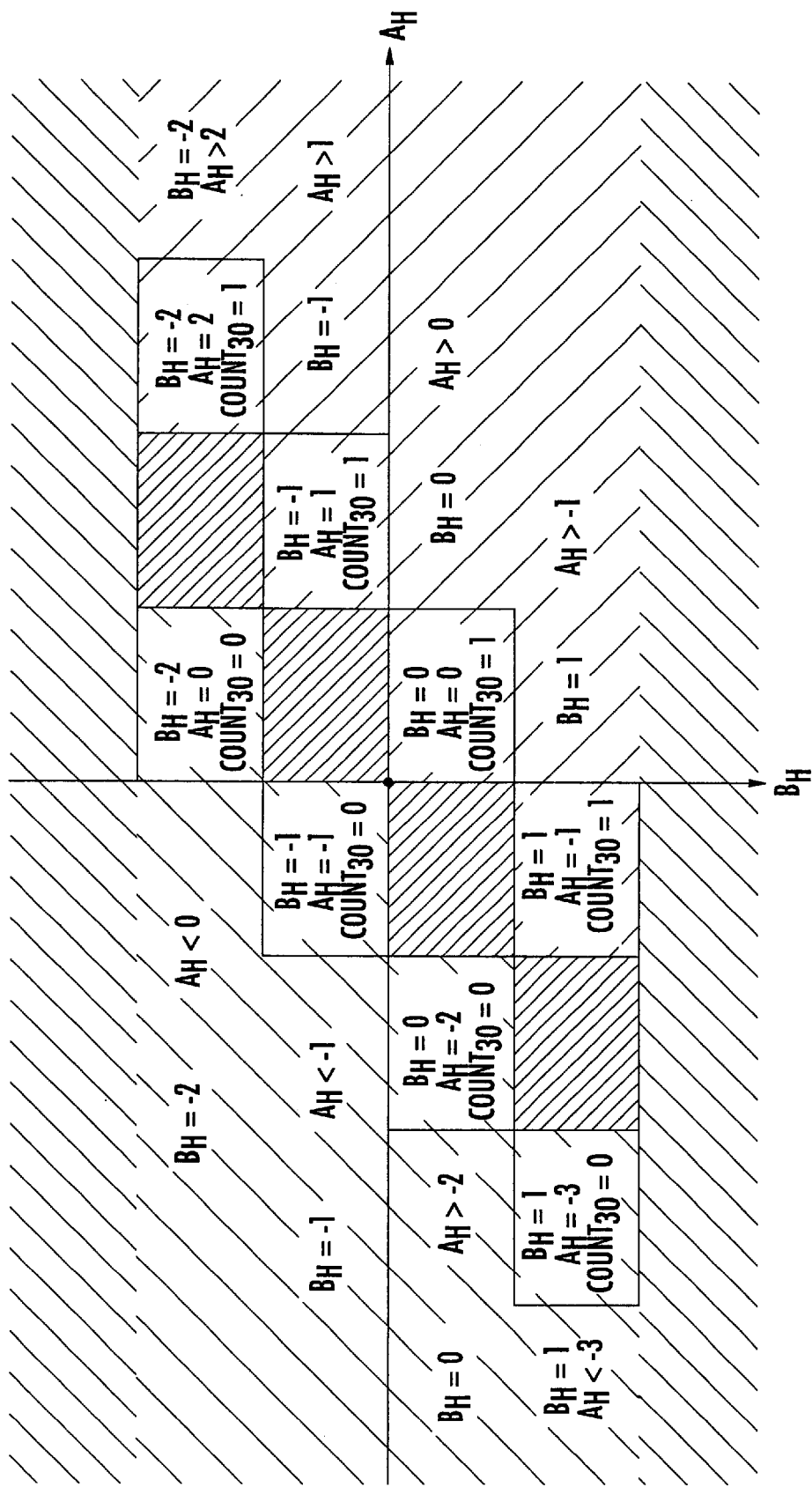
FIG. 3 shows a table containing saturation conditions for an ST10 microcontroller if operands A and B are written with terms $A_H$, $A_L$, $B_H$, $B_L$.

In this case, 8 positive saturation conditions of S can be determined, which are summarized in the right part of the table in FIG. 3.

More precisely, these conditions are:

$B_H=-2$ and $A_H>2$;

or $B_H=-1$ and $A_H>1$;

or $B_H=0$ and $A_H>0$;

or $B_H=1$ and $A_H>-1$;

or $B_H=-2$ and $A_H=2$ and $Cout_{30}=1$;

or $B_H=-1$ and $A_H=1$ and $Cout_{30}=1$;

or $B_H=0$ and $A_H=0$ and $Cout_{30}=1$;

or $B_H=1$ and $A_H=-1$ and $Cout_{30}=1$.

Considering the previous assumption about $B_H$, it is also possible to determine 8 negative saturation conditions that are summarized in the left part of the table in FIG. 3.

More precisely, these conditions are:

$B_H=-2$ and $A_H<0$;

or $B_H=-1$ and $A_H<-1$;

or $B_H=0$ and $A_H<-2$;

or $B_H=1$ and $A_H<-3$;

or $B_H=-2$ and $A_H=0$ and $Cout_{30}=0$;

or $B_H=-1$ and $A_H=-1$ and $Cout_{30}=0$;

or $B_H=0$ and $A_H=-2$ and $Cout_{30}=0$;

or $B_H=1$ and $A_H=-3$ and $Cout_{30}=0$.

Therefore as we have just seen, the first embodiment of the invention includes determining a possible overflow by checking if the values $A_H$, $B_H$ and $Cout_{n-2}$ satisfy the saturation conditions given above. A second embodiment of the invention includes using the propagation term P and the generation term G determined by the AU to determine if there will be an overflow of the format.

To accelerate processing by the AU, there are known methods of determining propagation terms $p_i$ and generation term $g_i$, both of which are functions of $a_i$ and $b_i$. In other words, the AU determines terms $p_i$ and $g_i$ such that:

$p_i=f_1(a_i, b_i, NP, NG)$;

and $g_i=f_2(a_i, b_i, NP, NG)$, where NP and NG are two vectors that are used to choose the arithmetic operation to be done (addition, subtraction, etc.).

$p_i$ and $g_i$ are defined differently as a function of $a_i$ and $b_i$ depending on the operation to be done.

In particular in the case of an addition, the propagation and generation terms are as follows:

$p_i = a_i \oplus b_i$;

and $g_i = a_i \cdot b_i$, where the symbol "$\oplus$" means exclusive OR and "." means AND.

In the case of a subtraction, $p_i$ and $g_i$ may be determined as follows:

$p_i = \overline{a_i \oplus b_i}$; and $g_i = a_i \cdot \overline{b_i}$.

Therefore, the result S of the operation is expressed as a function of the terms $p_i$ and $g_i$:

$S = f_3(A, B, C_{in})$;

therefore $S = f_4(P, G, C_{in})$.

The bits of S with order m−1 to n−1 are the only bits that are useful for detecting an overflow; they may be expressed as a function of the output carry digit of rank n−2, $Cout_{n-2}$, and the highest order terms $p_i$ and $g_i$:

$S_{m-1,n-1} = f_5(p_j, g_j, Cout_{n-2})$ where $n-1 \leq j \leq m-1$.

Thus, the P and G terms are defined differently with respect to operands A and B, depending on the arithmetic operation chosen. On the other hand, the relation given above for $S_{m-1,n-1}$ is always the same, such that saturation detection is the same for an addition, a subtraction and all operations for which P and G may be defined as a function of the operands A and B.

Therefore, the process according to the invention includes using these terms P and G to determine a possible overflow of the result S. When the AU has determined these terms P and G (step $E_1$), it transmits them to the evaluation unit 4 which determines whether or not there will be an overflow, by checking whether or not one of the saturation conditions is verified.

These saturation conditions based on the terms $P_H$ and $G_H$ are determined from the previously given conditions on $A_H$ and $B_H$, and considering that:

$$P = \sum_{i=0}^{m-1} p_i 2^i = \sum_{i=n-1}^{m-1} p_i 2^i + \sum_{i=0}^{n-2} p_i 2^i = P_H 2^{n-1} + P_L$$

where $$P_H = \sum_{i=n-1}^{m-1} p_i 2^{i-n+1} \text{ and } P_L = \sum_{i=0}^{n-2} p_i 2^i$$

$$G = \sum_{i=0}^{m-1} g_i 2^i = \sum_{i=n-1}^{m-1} g_i 2^i + \sum_{i=0}^{n-2} g_i 2^i = G_H 2^{n-1} + G_L$$

where $$G_H = \sum_{i=n-1}^{m-1} g_i 2^{i-n+1} \text{ and } G_L = \sum_{i=0}^{n-2} g_i 2^i$$

Using the assumptions given above for $A_H$ and $B_H$ for a DSP 950 signal processor, the following saturation conditions are determined:

Positive saturation conditions:

$B_H=0$ and $A_H>0$, if $B_H=0$ then $$\begin{cases} P_H = A_H \\ \text{and } G_H = 000000000 \end{cases}$$

if $A_H>0$ then $$\begin{cases} a_{39} = 0 \\ \text{and } \exists i \in [38:31], a_i = 1 \end{cases}$$

then: $p_{39}=0$ and ($\exists i \in [38:31]$, $p_i=1$) and $g_{39}=0$;

$B_H=-1$ and $A_H>1$, if $B_H=0$ then $$\begin{cases} P_H = \overline{A_H} \\ \text{and } G_H = A_H \end{cases}$$

if $A_H>1$ then $$\begin{cases} a_{39} = 0 \\ \text{and } \exists i \in [38:32], a_i = 1 \end{cases}$$

then $p_{39}=1$ and ($\exists i \in [38:32]$, $g_i=1$) and $g_{39}$ if $B_H=0$ and $A_H=0$ and $Cout_{30}=1$, then $$\begin{cases} P_H = 0 \\ \text{and } G_H = 0 \end{cases}$$

then: $\forall i \in [39:31]$, $p_i=0$ and $g_{39}=0$ and $\text{Cout}_{30}=1$;
$B_H=-1$ and $A_H=+1$ and $\text{Cout}_{30}=1$,
if $B_H=-1$ then
since $A_H=1$,
then ($\forall i \in [39:32]$, $p_i=1$) and $g_{31}=1$ and $\text{Cout}_{30}=1$.
Negative saturation conditions:
$B_H=0$ and $A_H<-2$,
if $B_H=0$ then $$\begin{cases} P_H = A_H \\ \text{and } G_H = 000000000 \end{cases}$$

if $A_H<-2$ then $$\begin{cases} a_{39} = 1 \\ \text{and } \exists i \in [38:32], a_i = 0 \end{cases}$$

then $p_{39}=1$ and $\exists i \in [38:32]$, $p_i=0$
and $\forall i \in [38:32]$, $g_i=0$;
$B_H=-1$ and if $A_H<-1$,
if $B_H=-1$ then
if $A_H<-1$ then $$\begin{cases} a_{39} = 1 \\ \text{and } \exists i \in [38:31], a_i = 0 \end{cases}$$

then $g_{39}=1$ and $\exists i \in [38:31]$, $g_i=0$;
$B_H=0$ and $A_H=-2$ and $\text{Cout}_{30}=0$,
if $B_H=0$ then $$\begin{cases} P_H = A_H \\ \text{and } G_H = 0 \end{cases}$$

if $A_H=-2$ then $$\begin{cases} a_{31} = 0 \\ \text{and } \forall i \in [39:32], a_i = 1 \end{cases}$$

then ($\forall i \in [39:32]$, $p_i=1$) and $p_{31}=0$ and $g_{31}=0$
and $\text{Cout}_{30}=0$;
$B_H=-1$ and $A_H=-1$ and $\text{Cout}_{30}=0$,
if $B_H=-1$ then
if $A_H=-1$ then $\forall i \in [39:31]$, $a_1=1$
then ($\forall i \in [39:31]$, $g_i=1$) and $\text{Cout}_{30}=0$.
The assumptions given above are used in the case of the ST 10 microcontroller. The following positive saturation conditions are then deduced:
if $B_H=-2$ and $A_H>2$
or if $B_H=-1$ and $A_H>1$
then $p_{39\ 1}$ and $g_{32}=1$ and $(p_{31})\text{XOR}(g_{31})=1$
or $p_{39}=1$ and $\exists i \in [38:33]$, $g_i=1$;
if $B_H=0$ and $A_H>0$
or if $B_H 1$ and $A_H>-1$,
which corresponds to $$\begin{cases} B_H \geq 0 \text{ and } A > -1 \\ \text{and not } (B_H = 0 \text{ and } A_H = 0) \end{cases}$$

then $p_{39}=0$ and $g_{39}=0$
and NOT ($\forall i \in [38:31]$, $p_i=0$ and $g_{31}=0$)
if $B_H=-2$ and $A_H=2$ and $\text{Cout}_{30}=1$,
which corresponds to $$\begin{cases} (\forall i \in [39:32], p_i = \overline{a_i} \text{ and } g_i = a_i) \\ \text{and } p_{31} = a_{31} \\ \text{and } g_{31} = 0 \\ \text{and } \text{Cout}_{30} = 1 \end{cases}$$

then: ($\forall i \in [39:32]$, $p_i=1$) and $p_{31}=0$ and $g_{32}=1$
and $g_{31}=0$ and $\text{Cout}_{30}=1$;
$B_H=-1$ and $A_H=1$ and $\text{Cout}_{30}=1$,
if $B_H=-1$ then $$\begin{cases} P_H = \overline{A_H} \\ \text{and } G_H = A_H \end{cases}$$

the condition becomes $$\begin{cases} p_{39} = 1 \\ \text{and } \forall i \in [38:32], p_i = 1 \\ \text{and } g_{31} = 1 \\ \text{and } \text{Cout}_{30} = 0 \end{cases}$$

then: ($\forall i \in [39:32]$, $p_i=1$) and $g_{31}=1$ and $\text{Cout}_{30}=1$;
$B_H=0$ and $A_H=0$ and $\text{Cout}_{30}=1$,
when $A_H=0$ and $$B_H = 0, \begin{cases} P_H = 0 \\ \text{and } G_H = 0 \end{cases}$$

then: ($\forall i \in [39:31]$, $p_i=0$) and $g_{39}=0$ and $g_{31}=0$ and $\text{Cout}_{30}=1$;
$B_H=1$ and $A_H=-1$ and $\text{Cout}_{30}=1$,
when $A_H=-1$ then $$\begin{cases} P_H = \overline{B_H} \\ \text{and } G_H = B_H \end{cases}$$

when $A_H=-1$ and $$B_H = 1, \begin{cases} P_{39} = 1 \\ \text{and } \forall i \in [38:32], p_i = 1 \\ \text{and } g_{31} = 1 \end{cases}$$

then ($\forall i \in [39:32]$, $p_i=1$) and $g_{31}=1$ and $\text{Cout}_{30}=1$,
and the negative saturation conditions:
if $B_H=-2$ and $A_H<0$ or if $B_H=-1$ and $A_H<-1$,
which corresponds to $$\begin{cases} B_H < 0 \\ \text{and } A_H < 0 \\ \text{and not } (B_H = -1 \text{ and } A_H = -1) \end{cases}$$

then $g_{39}=1$ and $\exists i\epsilon$ [38:31], $g_i=0$;
$B_H=0$ and $A_H<-2$,
when $B_H=0$ then $$\begin{cases} P_H = A_H \\ \text{and } G_H = 000000000 \end{cases}$$

then $$\begin{cases} a_{39} = 1 \\ \text{and } \exists i = [38:32], a_i = 0 \end{cases}$$

then: $p_{39}=1$ and $\exists i\epsilon$ [38:32], $p_i=0$
and $\forall i\epsilon$ [38:32], $g_i=0$;
$B_H=1$ and $A_H<-3$,
when $$B_H = 1, \begin{cases} (\forall i \in [39:32], p_i = a_i \text{ and } g_1 = 0) \\ \text{and } p_{31} = \overline{a_{31}} \text{ and } g_{31} = a_{31} \end{cases}$$

when $$A_H < -3, \begin{cases} A_H < 0 \\ \text{and } A_H \neq -1 \\ \text{and } A_H \neq -2 \\ \text{and } A_H \neq -3 \end{cases}$$

then: $p_{39}=1$ and $\exists i\epsilon$ [38:32], $g_i=0$
and not ($\forall i\epsilon$ [38:32], $p_i=1$)
and not ($\forall i\epsilon$ [38:33], $p_i=1$ and $p_{32}=0$ and $g_{31}=1$);
$B_H=-2$ and $A_H=0$ and $Cout_{30}=0$,
when $$B_H = -2, \begin{cases} (\forall i \in [39:32], p_i = \overline{a_i} \text{ and } g_i = a_i) \\ \text{and } p_{31} = a_{31} \\ \text{and } g_{31} = 0 \end{cases}$$

when $A_H=0$, $\forall i\epsilon$ [39:31], $a_i=0$
then ($\forall i\epsilon$ [39:32], $p_i=1$) and $p_{31}=0$ and $g_{31}=0$ and $Cout_{30}=0$;
$B_H=-1$ and $A_H=-1$ and $Cout_{30}=0$,
when $$B_H = -1, \begin{cases} P_H = \overline{A}_H \\ \text{and } G_H = A_H \end{cases}$$

when $A_H=-1$, $\forall i\epsilon$ [39:31], $a_i=1$
when $A_H=-1$, $\forall i\epsilon$ [39:31], $a_i=1$
then ($\forall i\epsilon$ [39:31], $g_i=1$) and $Cout_{30}=0$;

if $B_H=0$ and $A_H=-2$ and $Cout_{30}=0$,
when $$B_H = 0, \begin{cases} P_H = \overline{A}_H \\ \text{and } G_H = 0 \end{cases}$$

when $$A_H = -2, \begin{cases} a_{31} = 0 \\ \text{and } \forall i \in [39:32], a_i = 1 \end{cases}$$

then ($\forall i\epsilon$ [39:32], $p_i=1$) and $p_{31}=0$ and $g_{31}=0$ and $Cout_{30}=0$;
if $B_H=1$ and $A_H=-3$ and $Cout_{30}=0$,
when $$B_H = 1, \begin{cases} (\forall i \in [39:32], p_i = a_i \text{ and } g_i = 0) \\ \text{and } p_{31} = a_{31} \text{ and } g_{31} = a_{31} \end{cases}$$

then ($\forall i\epsilon$ [39:33], $p_i=1$) and $p_{32}=0$ and $g_{32}=0$ and $g_{31}=1$ and $Cout_{30}=0$.

Regardless of the method used to determine if there is an overflow, the process according to the invention includes supplying the multiplexer with a positive saturation value VALSAT+ or a negative saturation value VALSAT−, if an overflow is detected.

where $VALSAT^+=2^{n-1}-1$
$VALSAT^-=-2^{n-1}$

If the format that must not be exceeded is 32 bits, then:
$VALSAT^-$=FF 8 000 0000 h;
and $VALSAT^+$=00 7 FFF FFFF h.

If no overflow is detected, the evaluation unit 4 sends a NON-SAT message to the multiplexer 2 informing it that it can load the result S as soon as it has been determined.

That which is claimed is:

1. A method for determining an overflow to a format of a result of an arithmetic operation carried out by an arithmetic unit on two operands A and B and an input carry digit Cin input to the arithmetic unit, operands A and B being binary numbers and at least one of the operands A and B having m bits, the format of the result having n bits where n<m, the method comprising the steps of:
   considering only the m−n+1 highest order bits of operand A and operand B and an output carry digit $Cout_{n-2}$ of rank n−2; and
   checking whether or not the m−n+1 bits satisfy a saturation condition, and if so deducing a size the result will exceed n bits;
   both the considering and checking steps being carried out in parallel with processing done by the arithmetic unit on operands A and B before the arithmetic unit has determined the result of the arithmetic operation.

2. A method according to claim 1, wherein the m−n+1 highest order bits of operand A are denoted $A_H$ and the m−n+1 highest order bits of operand B are denoted $B_H$ and wherein the positive saturation condition is:
$A_H+B_H+Cout_{n-2} \geq 1$,
and a negative saturation condition is:
$A_H+B_H+Cout_{n-2} <-1$.

3. A method according to claim 2, wherein when A is expressed on 40 bits and B is expressed on 32 bits with n=32 and m=40, the positive saturation conditions are:

$B_H=0$ and $A_H>0$;

$B_H=-1$ and $A_H>1$;

$B_H=0$ and $A_H=0$ and $Cout_{30}=1$;

$B_H=-1$ and $A_H=1$ and $Cout_{30}=1$; and the negative saturation conditions are:

$B_H=0$ and $A_H<-2$;

$B_H=-1$ and $A_H<-1$;

$B_H=0$ and $A_H=-2$ and $Cout_{30}=0$;

$B_H=-1$ and $A_H=-1$ and $Cout_{30}=0$.

4. A method according to claim 3, wherein when A is expressed on 40 bits and B is expressed on 33 bits, with n=32 and m=40, the positive saturation conditions are:

$B_H=-2$ and $A_H>2$;

$B_H=-1$ and $A_H>1$;

$B_H=0$ and $A_H>0$;

$B_H=1$ and $A_H>-1$;

$B_H=-2$ and $A_H=2$ and $Cout_{30}=1$;

$B_H=-1$ and $A_H=1$ and $Cout_{30}=1$;

$B_H=0$ and $A_H=0$ and $Cout_{30}=1$;

$B_H=1$ and $A_H=-1$ and $Cout_{30}=1$; and the negative saturation conditions are:

$B_H=-2$ and $A_H<0$;

$B_H=-1$ and $A_H<-1$;

$B_H=0$ and $A_H<-2$;

$B_H=1$ and $A_H<-3$;

$B_H=-2$ and $A_H=0$ and $Cout_{30}=0$;

$B_H=-1$ and $A_H=-1$ and $Cout_{30}=0$;

$B_H=0$ and $A_H=-2$ and $Cout_{30}=0$;

$B_H=1$ and $A_H=-3$ and $Cout_{30}=0$.

5. A method according to claim 1, further comprising the step of determining propagation terms $p_i$ and generation terms $g_i$ each defined by a logical relation between components $a_i$ and $b_i$ of operands A and B before the considering or checking steps; and wherein the step of checking is based on using the m−n+1 highest order bits, denoted $P_H$ for propagation terms $p_i$ and denoted $G_H$ for generation terms $g_i$, and the output carry digit $Cout_{n-2}$ of rank n−2.

6. A method according to claim 5, wherein when A is expressed on 40 bits and B is expressed on 32 bits with n=32 and m=40, the positive saturation conditions are:

$g_{31}=1$ and ($\forall i \in (39:32)$, $p_i=1$) and $Cout_{30}=1$;

$p_{39}=1$ and $g_{39}=0$ and $\exists i \in (38:32)$, $g_i=1$;

$\forall i \in (39:31)$, $p_i=0$ and $Cout_{30}=1$;

$p_{39}=0$ and ($\exists i \in (38:31)$, $p_i=1$) and $g_{39}=0$; and the negative saturation conditions are:

$g_{39}=1$ and ($\exists i \in (38:31)$, $g_i=0$);

$\forall i \in (39:31)$, $g_i=1$ and $Cout_{30}=0$;

$p_{39}=1$ and $\exists i \in (38:32)$, $p_i=0$ and $\forall i \in (38:32)$, $g_i=0$ ($\forall i \in (39:32)$, $p_i=1$) and $g_{31}=0$ and $Cout_{30}=0$ and $p_{31}=0$.

7. A method according to claim 6, wherein when A is expressed on 40 bits and B is expressed on 33 bits with n=32 and m=40, the positive saturation conditions are:

$P_{39}=1$ and $g_{32}=1$ and $(p_{31})$ XOR $(g_{31})=1$ $p_{39}=1$ and $\exists i \in (38:33)$, $g_i=1$;

$p_{39}=0$ and $g_{39}=0$ and NOT ($\forall i \in (38:31)$, $p_i=0$ and $g_{31}=0$);

($\forall i \in (39:32)$, $p_i=1$) and $p_{31}=0$ and $g_{32}=1$ and $g_{31}=0$ and $Cout_{30}=1$;

($\forall i \in (39:32)$, $p_i=1$) and $g_{31}=1$ and $Cout_{30}=1$;

($\forall i \in (39:31)$, $p_i=0$) and $g_{39}=0$ and $g_{31}=0$ and $Cout_{30}=1$;

and the negative saturation conditions are:

$g_{39}=1$ and $\exists i \in (38:31)$, $g_i=0$ $p_{39}=1$ and $\exists i \in (38:32)$, $p_i=0$;

and $\forall i \in (38:32)$, $g_i=0$;

$p_{39}=1$ and $\forall i \in (38:32)$, $g_i=0$; and not ($\forall i \in (38:32)$, $p_i=1$) and not ($\forall i \in (38:33)$, $p_i=1$ and $p_{32}=0$ and $g_{31}=1$)

($\forall i \in (39:32)$, $p_i=1$) and $p_{31}=0$ and $g_{31}=0$ and $Cout_{30}=0$;

($\forall i \in (39:31)$, $g_i=1$) and $Cout_{30}=0$;

($\forall i \in (39:33)$, $p_i=1$) and $p_{32}=0$ and $g_{32}=0$ and $g_{31}=1$ and $Cout_{30}=0$.

8. A method according to claim 1, further comprising the step of saturating the result to a binary value $2^{n-1}-1$ for a positive saturation of a format with n bits, and to a binary value $-2^{n-1}$ for a negative saturation of a format with n bits responsive to an overflow.

9. A method for determining an overflow to a format of a result of an arithmetic operation carried out by an arithmetic unit on two operands A and B and an input carry digit Cin input to the arithmetic unit, operands A and B being binary numbers and at least one of the operands A and B having m bits, the format of the result having n bits where n<m, the method comprising the steps of:

considering only the m−n+1 highest order bits of operand A and operand B and an output carry digit $Cout_{n-2}$ of rank n−2;

checking whether or not the m−n+1 bits satisfy a saturation condition, and if so deducing a size the result will exceed n bits;

both the considering and checking steps being carried out in parallel with processing done by the arithmetic unit on operands A and B before the arithmetic unit has determined the result of the arithmetic operation;

wherein the m−n+1 highest order bits of operand A are denoted $A_H$ and the m−n+1 highest order bits of operand B are denoted $B_H$ and wherein the positive saturation condition is:

$A_H+B_H+Cout_{n-2} \leq 1$, and a negative saturation condition is:

$A_H+B_H+Cout_{n-2} < -1$; and saturating the result to a binary value $2^{n-1}-1$ for a positive saturation of a format with n bits, and to a binary value $-2^{n-1}$ for a negative saturation of a format with n bits.

10. A method according to claim 9, wherein when A is expressed on 40 bits and B is expressed on 32 bits with n=32 and m=40, the positive saturation conditions are:

$B_H=0$ and $A_H>0$;

$B_H=-1$ and $A_H>1$;

$B_H=0$ and $A_H=0$ and $Cout_{30}=1$;

$B_H=-1$ and $A_H=1$ and $Cout_{30}=1$; and the negative saturation conditions are:

$B_H=0$ and $A_H<-2$;

$B_H=-1$ and $A_H<-1$;

$B_H=0$ and $A_H=-2$ and $Cout_{30}=0$;

$B_H=-1$ and $A_H=-1$ and $Cout_{30}=0$.

11. A method according to claim 9, wherein when A is expressed on 40 bits and B is expressed on 33 bits, with n=32 and m=40, the positive saturation conditions are:

$B_H=-2$ and $A_H>2$;

$B_H=-1$ and $A_H>1$;

$B_H=0$ and $A_H>0$;

$B_H=1$ and $A_H>-1$;

$B_H=-2$ and $A_H=2$ and $Cout_{30}=1$;

$B_H=-1$ and $A_H=1$ and $Cout_{30}=1$;

$B_H=0$ and $A_H=0$ and $Cout_{30}=1$;

$B_H=1$ and $A_H=-1$ and $Cout_{30}=1$; and the negative saturation conditions are:

$B_H=-2$ and $A_H<0$;

$B_H=-1$ and $A_H<-1$;

$B_H=0$ and $A_H<-2$;

$B_H=1$ and $A_H<-3$;

$B_H=-2$ and $A_H=0$ and $Cout_{30}=0$;

$B_H=-1$ and $A_H=-1$ and $Cout_{30}=0$;

$B_H=0$ and $A_H=-2$ and $Cout_{30}=0$;

$B_H=1$ and $A_H=-3$ and $Cout_{30}=0$.

12. A method for determining an overflow to a format of a result of an arithmetic operation carried out by an arithmetic unit on two operands A and B and an input carry digit Cin input to the arithmetic unit, operands A and B being binary numbers and at least one of the operands A and B having m bits, the format of the result having n bits where n<m, the method comprising the steps of:

considering only the m−n+1 highest order bits of operand A and operand B and an output carry digit $Cout_{n-2}$ of rank n−2;

checking whether or not the m−n+1 bits satisfy a saturation condition, and if so deducing a size the result will exceed n bits;

both the considering and checking steps being carried out in parallel with processing done by the arithmetic unit on operands A and B before the arithmetic unit has determined the result of the arithmetic operation;

determining propagation terms $p_i$ and generation terms $g_i$ each defined by a logical relation between components $a_i$ and $b_i$ of operands A and B before the considering or checking steps;

wherein the step of checking is based on using the m−n+1 highest order bits, denoted $P_H$ for propagation terms $p_i$ and denoted $G_H$ for generation terms $g_i$, and the output carry digit $Cout_{n-2}$ of rank n−2; and saturating the result to a binary value $2^{n-1}-1$ for a positive saturation of a format with n bits, and to a binary value $-2^{n-1}$ for a negative saturation of a format with n bits.

13. A method according to claim 12, wherein when A is expressed on 40 bits and B is expressed on 32 bits with n=32 and m=40, the positive saturation conditions are:

$g_{31}=1$ and ($\forall i \in$ (39:32), $p_i=1$) and $Cout_{30}=1$;

$p_{39}=1$ and $g_{39}=0$ and $\exists i \in$ (38:32), $g_i=1$;

$\forall i \in$ (39:31), $p_i=0$ and $Cout_{30}=1$;

$p_{39}=0$ and ($\exists i \in$ (38:31), $p_i=1$) and $g_{39}=0$; and the negative saturation conditions are:

$g_{39}=1$ and ($\exists i \in$ (38:31), $g_i=0$);

$\forall i \in$ (39:31), $g_i=1$ and $Cout_{30}=0$;

$p_{39}=1$ and $\exists i \in$ (38:32), $p_i=0$ and $\forall i \in$ (38:32), $g_i=0$ ($\forall i \in$ (39:32), $p_i=1$) and $g_{31}=0$ and $Cout_{30}=0$ and $p_{31}=0$.

14. A method according to claim 12, wherein when A is expressed on 40 bits and B is expressed on 33 bits with n=32 and m=40, the positive saturation conditions are:

$p_{39}=1$ and $g_{32}=1$ and $(p_{31})$ XOR $(g_{31})=1$ $p_{39}=1$ and $\exists i \in$ (38:33), $g_i=1$;

$p_{39}=0$ and $g_{39}=0$ and NOT ($\forall i \in$ (38:31), $p_i=0$ and $g_{31}=0$);

($\forall i \in$ (39:32), $p_i=1$) and $p_{31}=0$ and $g_{32}=1$ and $g_{31}=0$ and $Cout_{30}=1$;

($\forall i \in$ (39:32), $p_i=1$) and $g_{31}=1$ and $Cout_{30}=1$;

($\forall i \in$ (39:31), $p_i=0$) and $g_{39}=0$ and $g_{31}=0$ and $Cout_{30}=1$; and the negative saturation conditions are:

$g_{39}=1$ and $\exists i \in$ (38:31), $g_i=0$ $p_{39}=1$ and $\exists i \in$ (38:32), $p_i=0$; and $\forall i \in$ (38:32), $g_i=0$;

$p_{39}=1$ and $\exists i \in$ (38:32), $g_i=0$; and not ($\forall i \in$ (38:32), $p_i=1$) and not ($\forall i \in$ (38:33), $p_i=1$ and $p_{32}=0$ and $g_{31}=1$)

($\forall i \in$ (39:32), $p_i=1$) and $p_{31}=0$ and $g_{31}=0$ and $Cout_{30}=0$;

($\forall i \in$ (39:31), $g_i=1$) and $Cout_{30}=0$;

($\forall i \in$ (39:33), $p_i=1$) and $p_{32}=0$ and $g_{32}=0$ and $g_{31}=1$ and $Cout_{30}=0$.

15. An apparatus for performing an arithmetic operation comprising:

an arithmetic unit; and overflow determining means for determining an overflow to a format of a result of an arithmetic operation carried out by the arithmetic unit on two operands A and B and an input carry digit Cin input to the arithmetic unit, operands A and B being binary numbers and at least one of the operands A and B having m bits, the format of the result having n bits where n<m, the overflow determining means comprising considering means for considering only the m−n+1 highest order bits of operand A and operand B and an output carry digit $Cout_{n-2}$ of rank n−2; and checking means for checking whether or not the m−n+1 bits satisfy a saturation condition, and if so deducing a size of the result S will exceed n bits;

both the considering and checking means carrying out operations in parallel with processing done by the arithmetic unit on operands A and B before the arithmetic unit has determined the result of the arithmetic operation.

16. An apparatus according to claim 15, further comprising means for saturating the result to a binary value $2^{n-1}-1$ for a positive saturation of a format with n bits, and for saturating the result to a binary value $-2^{n-1}$ for a negative saturation of a format with n bits based upon an overflow.

17. An apparatus for performing an arithmetic operation comprising:

an arithmetic unit; and an overflow determining unit for determining an overflow to a format of a result of an arithmetic operation carried out by said arithmetic unit on two operands A and B and an input carry digit Cin input to said arithmetic unit, operands A and B being binary numbers and at least one of the operands A and B having m bits, the format of the result having n bits where n<m, said overflow determining unit considering only the m−n+1 highest order bits of operand A and operand B and an output carry digit $Cout_{n-2}$ of rank n−2, said overflow determining unit also checking whether or not the m−n+1 bits satisfy a saturation condition, and if so deducing a size of the result S will exceed n bits;

said overflow determining unit carrying out operations in parallel with processing done by said arithmetic unit on operands A and B before said arithmetic unit has determined the result of the arithmetic operation.

18. An apparatus according to claim 17 wherein said overflow determining unit saturates the result to a binary value $2^{n-1}-1$ for a positive saturation of a format with n bits, and saturates the result to a binary value $-2^{n-1}$ for a negative saturation of a format with n bits based upon an overflow.

* * * * *

UNITED STATES PATENT AND TRADEMARK OFFICE
CERTIFICATE OF CORRECTION

PATENT NO. : 6,321,248 B1
DATED : November 20, 2001
INVENTOR(S) : Claire Bonnet, Sebastien Ferroussat and Didier Fuin It is certified that error appears in the above-identified patent and that said Letters Patent is hereby corrected as shown below:

Column 2,
Line 12, insert:
-- If A is expressed on 40 bits and B on 32 bits, where n = 32 and m = 40, the positive saturation conditions are:
$B_H = 0$ and $A_H > 0$;
or $B_H = -1$ and $A_H > 1$;
or $B_H = 0$ and $A_H = 0$ and $Cout_{30} = 1$;
or $B_H = -1$ and $A_H = 1$ and $Cout_{30} = 1$;
and the negative saturation conditions are:
$B_H = 0$ and $A_H < -2$;
or $B_H = -1$ and $A_H < -1$;
or $B_H = 0$ and $A_H = -2$ and $Cout_{30} = 0$;
or $B_H = -1$ and $A_H = -1$ and $Cout_{30} = 0$;
If A is expressed on 40 bits and B on 32 bits, with n = 32 and m = 40, the positive saturation conditions are:
$B_H = -2$ and $A_H > 2$;
or $B_H = -1$ and $A_H > 1$;
or $B_H = 0$ and $A_H > 0$;
or $B_H = 1$ and $A_H > -1$;
or $B_H = -2$ and $A_H = 2$ and $Cou_{t30} = 1$;
or $B_H = -1$ and $A_H = 1$ and $Cout_{30} = 1$;
or $B_H = 0$ and $A_H = 0$ and $Cout_{30} = 1$;
or $B_H = 1$ and $A_H = -1$ and $Cout_{30} = 1$;
and the negative saturation conditions are:
$B_H = -2$ and $A_H < 0$;
or $B_H = -1$ and $A_H < -1$;
or $B_H = 0$ and $A_H < -2$;
or $B_H = 1$ and $A_H < -3$;
or $B_H = -2$ and $A_H = 0$ and $Cout_{30} = 0$;
or $B_H = -1$ and $A_H = -1$ and $Cout_{30} = 0$;
or $B_H = 0$ and $A_H = -2$ and $Cout_{30} = 0$;
or $B_H = 1$ and $A_H = -3$ and $Cout_{30} = 0$;

UNITED STATES PATENT AND TRADEMARK OFFICE
CERTIFICATE OF CORRECTION

PATENT NO.   : 6,321,248 B1
DATED        : November 20, 2001
INVENTOR(S)  : Claire Bonnet, Sebastien Ferroussat and Didier Fuin It is certified that error appears in the above-identified patent and that said Letters Patent is hereby corrected as shown below:

Column 2,
Line 41, delete:
"In the following description of the process according to the invention, it will be considered that A and B are two binary numbers, that at least one of A and B has m bits, and that the result S is a binary number with m bits corrected to format with n bits (where A, B and S are coded in two's complement), where n and m depend on the use of the calculation unit. The process according to the invention checks whether the format of the result S that the AU has to calculate will have n bits or less than n bits."
Insert:

If A is expressed on 40 bits and B is expressed on 33 bits with $n = 32$ and $m = 40$, the positive saturation conditions are:

$P_{39} = 1$ and $g_{32} = 1$ and $(p_{31})$ XOR $(g_{31}) = 1$
$p_{39} = 1$ and $\exists i \in [38:33]$, $g_i = 1$;

$p_{39} = 0$ and $g_{39} = 0$
and NOT ($\forall i \in [38:31]$, $p_i = 0$ and $g_{31} = 0$);
($\forall i \in [39:32]$, $p_i = 1$) and $p_{31} = 0$ and $g_{32} = 1$
and $g_{31} = 0$ and $Cout_{30} = 1$;
($\forall i \in [39:32]$, $p_i = 1$) and $g_{31} = 1$
and $Cout_{30} = 1$;
($\forall i \in [39:31]$, $p_i = 0$) and $g_{39} = 0$ and $g_{31} = 0$
and $Cout_{30} = 1$,

UNITED STATES PATENT AND TRADEMARK OFFICE
CERTIFICATE OF CORRECTION

PATENT NO. : 6,321,248 B1
DATED : November 20, 2001
INVENTOR(S) : Claire Bonnet, Sebastien Ferroussat and Didier Fuin It is certified that error appears in the above-identified patent and that said Letters Patent is hereby corrected as shown below:

and the negative saturation conditions are:
$g_{39} = 1$ and $\exists i \in [38:31], g_i = 0$
$p_{39} = 1$ and $\exists i \in [38:32], p_i = 0$;
and $\forall i \in [38:32], g_i = 0$;
$p_{39} = 1$ and $\exists i \in [38:32], g_i = 0$;
and not $(\forall i \in [38:32], p_i = 1)$
and not $(\forall i \in [38:33], p_i = 1$ and $p_{32} = 0$ and $g_{31} = 1)$;
$(\forall i \in [39:32], p_i = 1)$ and $p_{31} = 0$ and $g_{31} = 0$
and $Cout_{30} = 0$;
$(\forall i \in [39:31], g_i = 1)$ and $Cout_{30} = 0$;
$(\forall i \in [39:33], p_i = 1)$ and $p_{32} = 0$ and $g_{32} = 0$
and $g_{31} = 1$ and $Cout_{30} = 0$.

Signed and Sealed this

Twenty-third Day of July, 2002

*Attest:*

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO.     : 6,321,248 B1
DATED          : November 20, 2001
INVENTOR(S)    : Claire Bonnet, Sebastien Ferroussat and Didier Fuin It is certified that error appears in the above-identified patent and that said Letters Patent is hereby corrected as shown below:

Column 2,
Line 12, insert:
-- If A is expressed on 40 bits and B on 32 bits, where n = 32 and m = 40, the positive saturation conditions are:
$B_H = 0$ and $A_H > 0$;
or $B_H = -1$ and $A_H > 1$;
or $B_H = 0$ and $A_H = 0$ and $Cout_{30} = 1$;
or $B_H = -1$ and $A_H = 1$ and $Cout_{30} = 1$;
and the negative saturation conditions are:
$B_H = 0$ and $A_H < -2$;
or $B_H = -1$ and $A_H < -1$;
or $B_H = 0$ and $A_H = -2$ and $Cout_{30} = 0$;
or $B_H = -1$ and $A_H = -1$ and $Cout_{30} = 0$;
If A is expressed on 40 bits and B on 32 bits, with n = 32 and m = 40, the positive saturation conditions are:
$B_H = -2$ and $A_H > 2$;
or $B_H = -1$ and $A_H > 1$;
or $B_H = 0$ and $A_H > 0$;
or $B_H = 1$ and $A_H > -1$;
or $B_H = -2$ and $A_H = 2$ and $Cout_{30} = 1$;
or $B_H = -1$ and $A_H = 1$ and $Cout_{30} = 1$;
or $B_H = 0$ and $A_H = 0$ and $Cout_{30} = 1$;
or $B_H = 1$ and $A_H = -1$ and $Cout_{30} = 1$;
and the negative saturation conditions are:
$B_H = -2$ and $A_H < 0$;
or $B_H = -1$ and $A_H < -1$;
or $B_H = 0$ and $A_H < -2$;
or $B_H = 1$ and $A_H < -3$;
or $B_H = -2$ and $A_H = 0$ and $Cout_{30} = 0$;
or $B_H = -1$ and $A_H = -1$ and $Cout_{30} = 0$;
or $B_H = 0$ and $A_H = -2$ and $Cout_{30} = 0$;
or $B_H = 1$ and $A_H = -3$ and $Cout_{30} = 0$;

UNITED STATES PATENT AND TRADEMARK OFFICE
CERTIFICATE OF CORRECTION

PATENT NO.   : 6,321,248 B1
DATED        : November 20, 2001
INVENTOR(S)  : Claire Bonnet, Sebastien Ferroussat and Didier Fuin It is certified that error appears in the above-identified patent and that said Letters Patent is hereby corrected as shown below:

Column 2,
Line 41, delete:
"In the following description of the process according to the invention, it will be considered that A and B are two binary numbers, that at least one of A and B has m bits, and that the result S is a binary number with m bits corrected to format with n bits (where A, B and S are coded in two's complement), where n and m depend on the use of the calculation unit. The process according to the invention checks whether the format of the result S that the AU has to calculate will have n bits or less than n bits."
Insert:

If A is expressed on 40 bits and B is expressed on 33 bits with n = 32 and m = 40, the positive saturation conditions are:

$P_{39} = 1$ and $g_{32} = 1$ and $(p_{31})$ XOR $(g_{31}) = 1$ $p_{39} = 1$ and $\exists i \in [38:33]$, $g_i = 1$;

$p_{39} = 0$ and $g_{39} = 0$
and NOT ($\forall i \in [38:31]$, $p_i = 0$ and $g_{31} = 0$);

($\forall i \in [39:32]$, $p_i = 1$) and $p_{31} = 0$ and $g_{32} = 1$
and $g_{31} = 0$ and $Cout_{30} = 1$;

($\forall i \in [39:32]$, $p_i = 1$) and $g_{31} = 1$
and $Cout_{30} = 1$;

($\forall i \in [39:31]$, $p_i = 0$) and $g_{39} = 0$ and $g_{31} = 0$
and $Cout_{30} = 1$,

UNITED STATES PATENT AND TRADEMARK OFFICE
CERTIFICATE OF CORRECTION

PATENT NO. : 6,321,248 B1
DATED : November 20, 2001
INVENTOR(S) : Claire Bonnet, Sebastien Ferroussat and Didier Fuin It is certified that error appears in the above-identified patent and that said Letters Patent is hereby corrected as shown below:

and the negative saturation conditions are:
$g_{39} = 1$ and $\exists i \in [38:31]$, $g_i = 0$
$p_{39} = 1$ and $\exists i \in [38:32]$, $p_i = 0$;
and $\forall i \in [38:32]$, $g_i = 0$;
$p_{39} = 1$ and $\exists i \in [38:32]$, $g_i = 0$;
and not ($\forall i \in [38:32]$, $p_i = 1$)
and not ($\forall i \in [38:33]$, $p_i = 1$ and $p_{32} = 0$ and $g_{31} = 1$);
($\forall i \in [39:32]$, $p_i = 1$) and $p_{31} = 0$ and $g_{31} = 0$
and $Cout_{30} = 0$;
($\forall i \in [39:31]$, $g_i = 1$) and $Cout_{30} = 0$;
($\forall i \in [39:33]$, $p_i = 1$) and $p_{32} = 0$ and $g_{32} = 0$
and $g_{31} = 1$ and $Cout_{30} = 0$.

This certificate supersedes Certificate of Correction issued July 23, 2002.

Signed and Sealed this

Tenth Day of September, 2002

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 6,321,248 B1
DATED : November 20, 2001
INVENTOR(S) : Claire Bonnet, Sebastien Ferroussat and Didier Fuin It is certified that error appears in the above-identified patent and that said Letters Patent is hereby corrected as shown below:

Column 2,
Line 12, insert:
-- If A is expressed on 40 bits and B on 32 bits, where n = 32 and m = 40, the positive saturation conditions are:
$B_H = 0$ and $A_H > 0$;
or $B_H = -1$ and $A_H > 1$;
or $B_H = 0$ and $A_H = 0$ and $Cout_{30} = 1$;
or $B_H = -1$ and $A_H = 1$ and $Cout_{30} = 1$;
and the negative saturation conditions are:
$B_H = 0$ and $A_H < -2$;
or $B_H = -1$ and $A_H < -1$;
or $B_H = 0$ and $A_H = -2$ and $Cout_{30} = 0$;
or $B_H = -1$ and $A_H = -1$ and $Cout_{30} = 0$;
If A is expressed on 40 bits and B on 32 bits, with n = 32 and m = 40, the positive saturation conditions are:
$B_H = -2$ and $A_H > 2$;
or $B_H = -1$ and $A_H > 1$;
or $B_H = 0$ and $A_H > 0$;
or $B_H = 1$ and $A_H > -1$;
or $B_H = -2$ and $A_H = 2$ and $Cout_{30} = 1$;
or $B_H = -1$ and $A_H = 1$ and $Cout_{30} = 1$;
or $B_H = 0$ and $A_H = 0$ and $Cout_{30} = 1$;
or $B_H = 1$ and $A_H = -1$ and $Cout_{30} = 1$;
and the negative saturation conditions are:
$B_H = -2$ and $A_H < 0$;
or $B_H = -1$ and $A_H < -1$;
or $B_H = 0$ and $A_H < -2$;
or $B_H = 1$ and $A_H < -3$;
or $B_H = -2$ and $A_H = 0$ and $Cout_{30} = 0$;
or $B_H = -1$ and $A_H = -1$ and $Cout_{30} = 0$;
or $B_H = 0$ and $A_H = -2$ and $Cout_{30} = 0$;
or $B_H = 1$ and $A_H = -3$ and $Cout_{30} = 0$;

UNITED STATES PATENT AND TRADEMARK OFFICE
CERTIFICATE OF CORRECTION

PATENT NO. : 6,321,248 B1
DATED : November 20, 2001
INVENTOR(S) : Claire Bonnet, Sebastien Ferroussat and Didier Fuin It is certified that error appears in the above-identified patent and that said Letters Patent is hereby corrected as shown below:

Column 2,
Line 41, delete:
"In the following description of the process according to the invention, it will be considered that A and B are two binary numbers, that at least one of A and B has m bits, and that the result S is a binary number with m bits corrected to format with n bits (where A, B and S are coded in two's complement), where n and m depend on the use of the calculation unit. The process according to the invention checks whether the format of the result S that the AU has to calculate will have n bits or less than n bits."
Insert:

If A is expressed on 40 bits and B is expressed on 33 bits with $n = 32$ and $m = 40$, the positive saturation conditions are:

$P_{39} = 1$ and $g_{32} = 1$ and $(p_{31})$ XOR $(g_{31}) = 1$
$p_{39} = 1$ and $\exists i \in [38:33]$, $g_i = 1$;
$p_{39} = 0$ and $g_{39} = 0$
and NOT ($\forall i \in [38:31]$, $p_i = 0$ and $g_{31} = 0$);
($\forall i \in [39:32]$, $p_i = 1$) and $p_{31} = 0$ and $g_{32} = 1$
and $g_{31} = 0$ and $Cout_{30} = 1$;
($\forall i \in [39:32]$, $p_i = 1$) and $g_{31} = 1$
and $Cout_{30} = 1$;
($\forall i \in [39:31]$, $p_i = 0$) and $g_{39} = 0$ and $g_{31} = 0$
and $Cout_{30} = 1$,

UNITED STATES PATENT AND TRADEMARK OFFICE
CERTIFICATE OF CORRECTION

PATENT NO. : 6,321,248 B1
DATED : November 20, 2001
INVENTOR(S) : Claire Bonnet, Sebastien Ferroussat and Didier Fuin It is certified that error appears in the above-identified patent and that said Letters Patent is hereby corrected as shown below:

and the negative saturation conditions are:
$$g_{39} = 1 \text{ and } \exists i \in [38:31], g_i = 0$$
$$p_{39} = 1 \text{ and } \exists i \in [38:32], p_i = 0;$$
$$\text{and } \forall i \in [38:32], g_i = 0;$$
$$p_{39} = 1 \text{ and } \exists i \in [38:32], g_i = 0;$$
$$\text{and not } (\forall i \in [38:32], p_i = 1)$$
$$\text{and not } (\forall i \in [38:33], p_i = 1 \text{ and } p_{32} = 0 \text{ and } g_{31} = 1);$$
$$(\forall i \in [39:32], p_i = 1) \text{ and } p_{31} = 0 \text{ and } g_{31} = 0$$
$$\text{and } Cout_{30} = 0;$$
$$(\forall i \in [39:31], g_i = 1) \text{ and } Cout_{30} = 0;$$
$$(\forall i \in [39:33], p_i = 1) \text{ and } p_{32} = 0 \text{ and } g_{32} = 0$$
$$\text{and } g_{31} = 1 \text{ and } Cout_{30} = 0.$$

This certificate supersedes Certificate of Correction issued July 23, 2002.

Signed and Sealed this

Fifteenth Day of October, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,321,248 B1
DATED : November 20, 2001
INVENTOR(S) : Claire Bonnet, Sebastien Ferroussat and Didier Fuin It is certified that error appears in the above-identified patent and that said Letters Patent is hereby corrected as shown below:

Column 2,
Line 12, insert:

-- If A is expressed on 40 bits and B on 32 bits, where n = 32 and m = 40, the positive saturation conditions are:
$B_H = 0$ and $A_H > 0$;
or $B_H = -1$ and $A_H > 1$;
or $B_H = 0$ and $A_H = 0$ and $Cout_{30} = 1$;
or $B_H = -1$ and $A_H = 1$ and $Cout_{30} = 1$;
and the negative saturation conditions are:
$B_H = 0$ and $A_H < -2$;
or $B_H = -1$ and $A_H < -1$;
or $B_H = 0$ and $A_H = -2$ and $Cout_{30} = 0$;
or $B_H = -1$ and $A_H = -1$ and $Cout_{30} = 0$;
If A is expressed on 40 bits and B on 32 bits, with n = 32 and m = 40, the positive saturation conditions are:
$B_H = -2$ and $A_H > 2$;
or $B_H = -1$ and $A_H > 1$;
or $B_H = 0$ and $A_H > 0$;
or $B_H = 1$ and $A_H > -1$;
or $B_H = -2$ and $A_H = 2$ and $Cout_{30} = 1$;
or $B_H = -1$ and $A_H = 1$ and $Cout_{30} = 1$;
or $B_H = 0$ and $A_H = 0$ and $Cout_{30} = 1$;
or $B_H = 1$ and $A_H = -1$ and $Cout_{30} = 1$;
and the negative saturation conditions are:
$B_H = -2$ and $A_H < 0$;
or $B_H = -1$ and $A_H < -1$;
or $B_H = 0$ and $A_H < -2$;
or $B_H = 1$ and $A_H < -3$;
or $B_H = -2$ and $A_H = 0$ and $Cout_{30} = 0$;
or $B_H = -1$ and $A_H = -1$ and $Cout_{30} = 0$;
or $B_H = 0$ and $A_H = -2$ and $Cout_{30} = 0$;
or $B_H = 1$ and $A_H = -3$ and $Cout_{30} = 0$; --

UNITED STATES PATENT AND TRADEMARK OFFICE
CERTIFICATE OF CORRECTION

PATENT NO.   : 6,321,248 B1
DATED        : November 20, 2001
INVENTOR(S)  : Claire Bonnet, Sebastien Ferroussat and Didier Fuin It is certified that error appears in the above-identified patent and that said Letters Patent is hereby corrected as shown below:

<u>Column 2,</u>
Line 41, delete:
"In the following description of the process according to the invention, it will be considered that A and B are two binary numbers, that at least one of A and B has m bits, and that the result S is a binary number with m bits corrected to format with n bits (where A, B and S are coded in two's complement), where n and m depend on the use of the calculation unit. The process according to the invention checks whether the format of the result S that the AU has to calculate will have n bits or less than n bits."
Insert:
-- If A is expressed on 40 bits and B is expressed on 33 bits with n = 32 and m = 40, the positive saturation conditions are:

$P_{39} = 1$ and $g_{32} = 1$ and $(p_{31})$ XOR $(g_{31}) = 1$
$p_{39} = 1$ and $\exists i \in [38:33], g_i = 1$;
$p_{39} = 0$ and $g_{39} = 0$
and NOT ($\forall i \in [38:31], p_i = 0$ and $g_{31} = 0$);
($\forall i \in [39:32], p_i = 1$) and $p_{31} = 0$ and $g_{32} = 1$
and $g_{31} = 0$ and $Cout_{30} = 1$;
($\forall i \in [39:32], p_i = 1$) and $g_{31} = 1$
and $Cout_{30} = 1$;
($\forall i \in [39:31], p_i = 0$) and $g_{39} = 0$ and $g_{31} = 0$
and $Cout_{30} = 1$, and the negative saturation conditions are:
$g_{39} = 1$ and $\exists i \in [38:31], g_i = 0$
$p_{39} = 1$ and $\exists i \in [38:32], p_i = 0$;
and $\forall i \in [38:32], g_i = 0$;
$p_{39} = 1$ and $\exists i \in [38:32], g_i = 0$;
and not ($\forall i \in [38:32], p_i = 1$)
and not ($\forall i \in [38:33], p_i = 1$ and $p_{32} = 0$ and $g_{31} = 1$);
($\forall i \in [39:32], p_i = 1$) and $p_{31} = 0$ and $g_{31} = 0$
and $Cout_{30} = 0$;
($\forall i \in [39:31], g_i = 1$) and $Cout_{30} = 0$;
($\forall i \in [39:33], p_i = 1$) and $p_{32} = 0$ and $g_{32} = 0$
and $g_{31} = 1$ and $Cout_{30} = 0$.

UNITED STATES PATENT AND TRADEMARK OFFICE
CERTIFICATE OF CORRECTION

PATENT NO. : 6,321,248 B1
DATED : November 20, 2001
INVENTOR(S) : Claire Bonnet, Sebastien Ferroussat and Didier Fuin It is certified that error appears in the above-identified patent and that said Letters Patent is hereby corrected as shown below:

Regardless of the embodiment, the process according to the invention when there is an overflow may include saturating the result to the binary value $2^{n-1}-1$ for a positive saturation, or the value $-2^{n-1}$ for a negative saturation, for a saturation format with n bits. --

Column 4,
Lines 41, 47, 50 and 52, delete "$B_H$-1" insert -- $B_H=-1$ --
Line 67, delete "$B_H$-2 or $B_H$-1" insert -- $B_H=-2$ or $B_H=-1$ --

Column 7,
Line 66, delete "$P_{39\ 1}$" insert -- $P_{39}=1$ --

Column 8,
Line 2, delete "$B_H1$" insert -- $B_H=1$ --
Line 12, delete "$Cout_{30=}1$" insert -- $Cout_{30}=1$ --

Column 9,
Line 20, delete "$\exists i=[38:32], a_i = 0$" insert -- $\exists i \epsilon\ [38:32], g_i = 0$ --

Column 10,
Line 5, delete "$P_H = \ A_H$" insert -- $P_H = A_H$ --

Column 12,
Line 38, delete "$A_H+B_H+Cout_{n-2} \leq 1$, and" insert -- $A_H+B_H+Cout_{n-2} \geq 1$, and --

This certificate supersedes Certificate of Correction issued October 15, 2002.

Signed and Sealed this

Twenty-fifth Day of February, 2003

JAMES E. ROGAN
*Director of the United States Patent and Trademark Office*